(12) United States Patent
Batt

(10) Patent No.: US 9,364,926 B2
(45) Date of Patent: Jun. 14, 2016

(54) SYSTEM AND METHOD OF ASSEMBLING COMPONENTS

(71) Applicant: The Boeing Company, Chicago, IL (US)

(72) Inventor: Edward John Batt, Bothel, WA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 13/875,298

(22) Filed: May 2, 2013

(65) Prior Publication Data

US 2014/0325813 A1 Nov. 6, 2014

(51) Int. Cl.

| | |
|---|---|
| *B23P 19/00* | (2006.01) |
| *B23P 21/00* | (2006.01) |
| *G01B 5/20* | (2006.01) |
| *G01B 3/14* | (2006.01) |
| *B23P 13/00* | (2006.01) |
| *B23P 19/04* | (2006.01) |
| *B64F 5/00* | (2006.01) |

(52) U.S. Cl.
CPC ............ *B23P 13/00* (2013.01); *B23P 19/04* (2013.01); *B23P 21/002* (2013.01); *B64F 5/0009* (2013.01); *B23P 2700/01* (2013.01); *Y10T 29/49826* (2015.01); *Y10T 29/53996* (2015.01)

(58) Field of Classification Search
CPC ........ B23P 13/00; B23P 19/04; B23P 21/002; B23P 2700/01; B64F 5/0009; Y10T 29/53996; Y10T 29/49826; G01B 5/207; G01B 7/287
USPC ............ 29/700, 714, 720, 721; 33/561.3, 552
See application file for complete search history.

(56) References Cited

U.S. PATENT DOCUMENTS

| | | | | |
|---|---|---|---|---|
| 4,589,199 A | * | 5/1986 | Ohtaki et al. | 29/714 |
| 4,821,408 A | * | 4/1989 | Speller et al. | 29/701 |
| 5,460,064 A | * | 10/1995 | Zayat, Jr. | 81/185 |
| 5,560,102 A | * | 10/1996 | Micale et al. | 29/897.2 |
| 5,910,894 A | | 6/1999 | Pryor | |
| 6,141,848 A | * | 11/2000 | Yousko et al. | 29/33 K |
| 6,170,157 B1 | | 1/2001 | Munk et al. | |
| 6,430,796 B1 | * | 8/2002 | Jones et al. | 29/243.53 |
| 7,076,856 B2 | | 7/2006 | Sarh | |
| 7,290,761 B2 | * | 11/2007 | Siegel | 269/266 |
| 8,240,648 B1 | * | 8/2012 | Pluymers et al. | 269/254 CS |

(Continued)

FOREIGN PATENT DOCUMENTS

| | | |
|---|---|---|
| DE | 102011116437 | 4/2013 |
| EP | 1563958 | 8/2005 |

OTHER PUBLICATIONS

PCT/US2014/034890, International Search Report, dated Aug. 18, 2014.

*Primary Examiner* — Essama Omgba
*Assistant Examiner* — Darrell C Ford

(57) ABSTRACT

A system for distortional clamping of a flexible member may include a dimensional reader and a positioning fixture. The dimensional reader may have a plurality of reader pogos that may be axially movable into contacting relation with a detail to measure a detail contour. The positioning fixture may have a plurality of positioning pogos and at least one clamping finger configured to mechanically clamp a flexible member between the positioning pogos and the clamping finger. The positioning pogos may be axially movable to deflect the flexible member into a contour that may be complementary to the detail contour.

20 Claims, 14 Drawing Sheets

(56) References Cited

U.S. PATENT DOCUMENTS

| | | | |
|---|---|---|---|
| 2005/0029727 A1* | 2/2005 | Siegel | 269/266 |
| 2008/0003087 A1* | 1/2008 | Geiss et al. | 414/431 |
| 2008/0120044 A1* | 5/2008 | Hoysan | 702/41 |
| 2009/0031824 A1* | 2/2009 | Syassen | 73/862.541 |
| 2009/0113993 A1* | 5/2009 | Elting et al. | 73/37.7 |
| 2012/0130528 A1* | 5/2012 | Stark et al. | 700/114 |
| 2015/0314890 A1* | 11/2015 | DesJardien | B64F 5/0009 212/324 |
| 2015/0336271 A1* | 11/2015 | Spicer | B23K 31/12 428/195.1 |

* cited by examiner

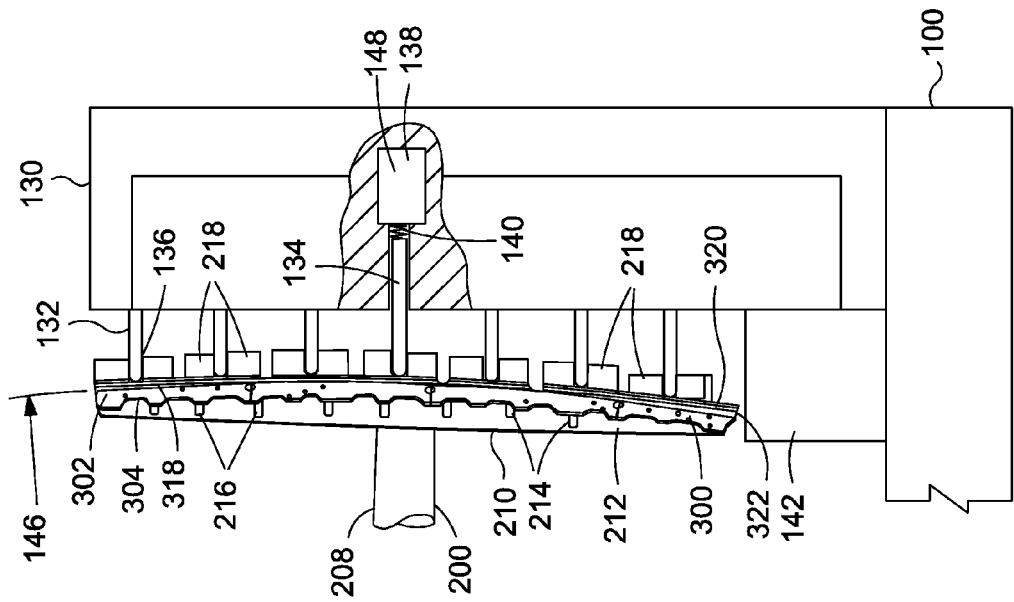
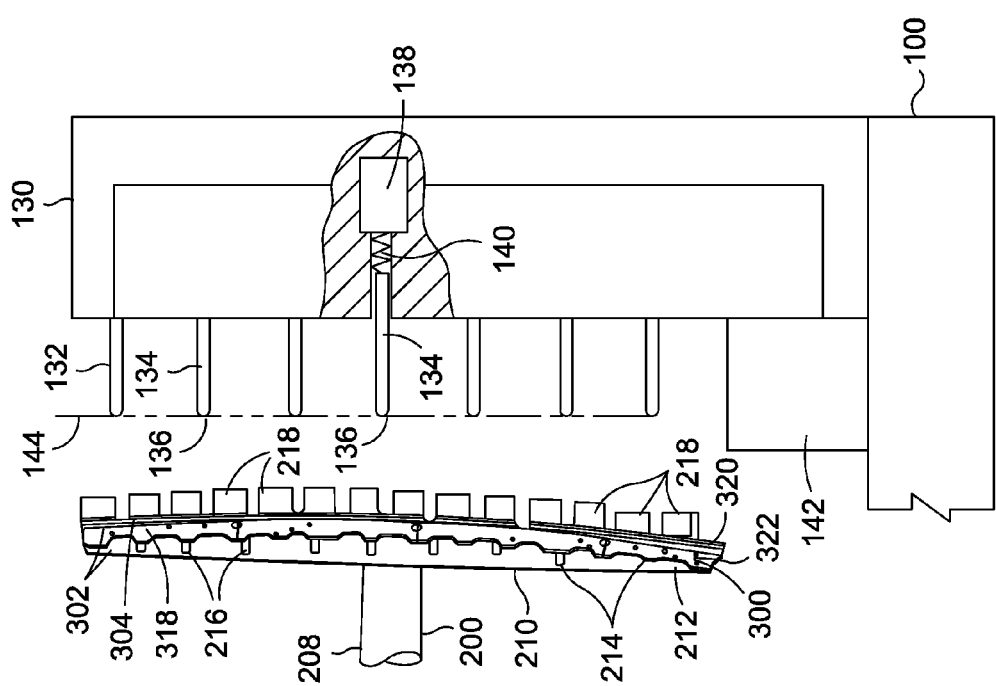

SYSTEM AND METHOD OF ASSEMBLING COMPONENTS

FIELD

The present disclosure relates generally to the assembly of structural components and, more particularly, to assembling two or more contoured components.

BACKGROUND

The construction of an aircraft typically involves the fabrication of a number of subassemblies. For example, an aircraft wing may be formed as a subassembly of one or more wing panels assembled with one or more spars, stringers, ribs, and other structural elements or details such as a side-of-body chord member. A side-of-body chord may be mounted to an inboard edge of a wing panel to provide structural reinforcement at the wing-fuselage juncture. In an embodiment, the side-of-body chord may be provided with a clevis edge having a slot that may be configured to mate to an inboard edge of the wing panel. Because of the aerodynamic contour of the wing panel, the side-of-body chord may be fabricated with a contour that is generally complementary to the wing panel contour to allow the slot of the side-of-body chord to be fitted onto the edge of the wing panel.

Occasionally, a side-of-body chord may be fabricated with a contour that is non-complementary to the contour of the wing panel such that the side-of-body chord may not fit over the wing panel edge without the use of force. Conventional methods for applying force to install the side-of-body chord include the manual application of localized force to the side-of-body chord and/or to the wing panel. Unfortunately, the wing panel and/or the side-of-body chord may be relatively large and/or stiff elements such that extensive force may be required to urge the side-of-body chord onto the wing panel with potentially undesirable effects. Furthermore, the manual application of localized force to the wing panel and/or the side-of-body chord may be a time-consuming process which may have an undesirable effect on the production schedule.

As can be seen, there exists a need in the art for a system and method for assembling components without the manual application of localized force.

SUMMARY

The above-noted needs associated with assembly of components are specifically addressed and alleviated by the present disclosure which provides a system for distortional clamping of a flexible member. The system may include a dimensional reader and a positioning fixture. The dimensional reader may have a plurality of reader pogos that may be axially movable into contacting relation with a detail to measure a detail contour. The positioning fixture may have a plurality of positioning pogos and at least one clamping finger configured to mechanically clamp a flexible member between the positioning pogos and the clamping finger. The positioning pogos may be axially movable to deflect the flexible member into a contour that may be complementary to the detail contour.

In a further embodiment, disclosed is a system for distortional clamping of a flexible member into a contour complementary to a detail. The system may include a dimensional reader, a positioning fixture, and an automated handling mechanism. The dimensional reader may have a plurality of reader pogos that may be axially movable into contacting relation with a detail to measure a detail contour. The reader pogos may be coupled to displacement transducers configured to measure a detail contour. The positioning fixture may have a plurality of positioning pogos and at least one clamping finger configured to mechanically clamp a flexible member between the positioning pogos and the clamping finger. The positioning pogos may be axially movable to deflect the flexible member into a contour that may be complementary to the detail contour. The automated handling mechanism may have an end effector configured to position the detail relative to the dimensional reader.

Also disclosed is a method of assembling a detail to a flexible member. The method may include positioning a detail against a plurality of reader pogos, axially displacing the plurality of reader pogos to substantially conform to a detail contour, and recording reader pogo position data representing the detail contour. The method may also include clamping a flexible member against a plurality of positioning pogos. In addition, the method may include axially displacing the plurality of positioning pogos complementary to the reader pogo position data, and deflecting, using the positioning pogos, the flexible member into a contour corresponding to the reader pogo position data. The method may further include assembling the detail to the flexible member.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 10 is an end view of the dimensional reader illustrating the plurality of reader pogos in an original reader pogo position;

FIG. 11 is an end view of the dimensional reader taken along line 11 of FIG. 9 and illustrating the axial displacement of the reader pogos in contact with the detail contour;

DETAILED DESCRIPTION

Figure 1:
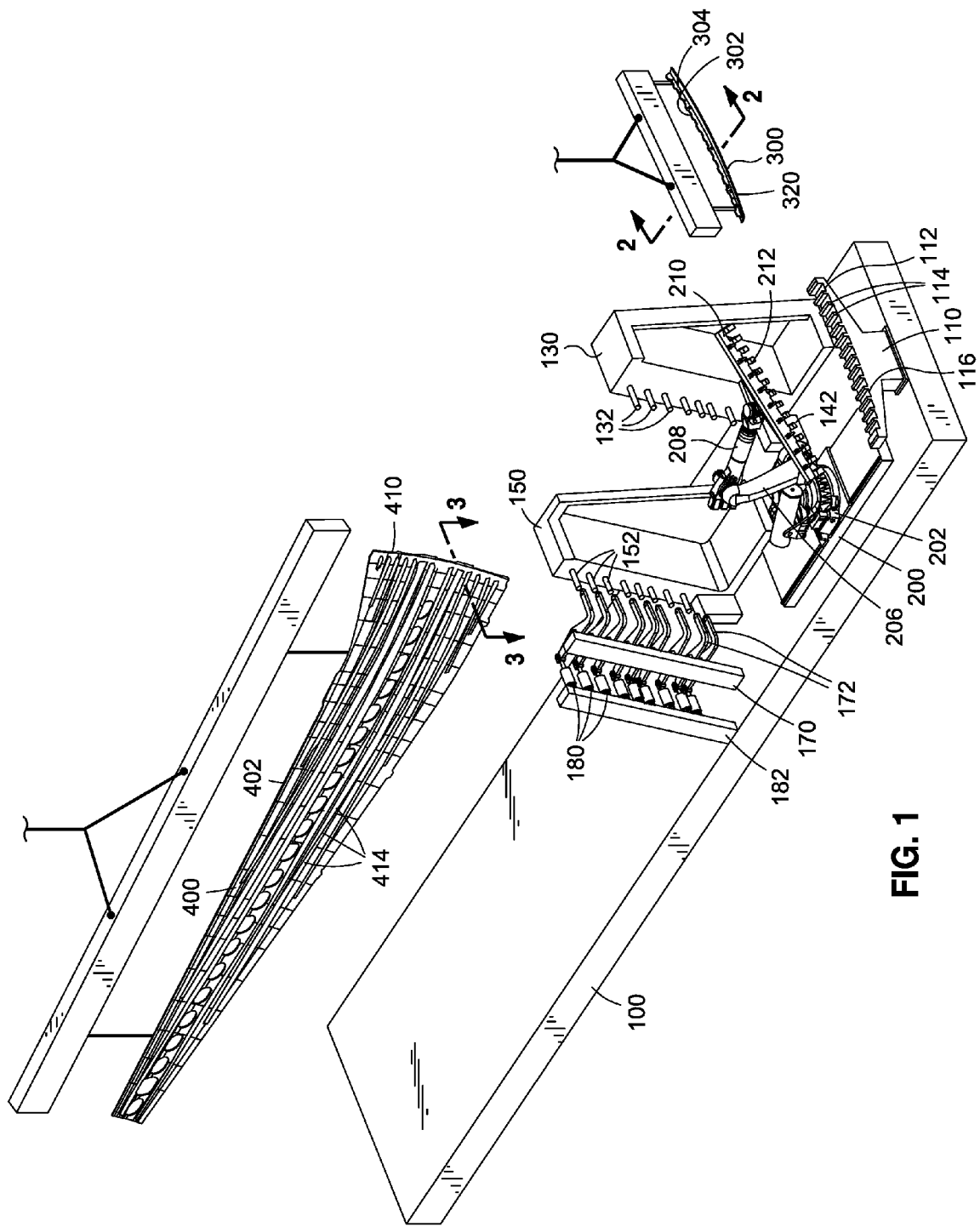
FIG. 1 is a perspective illustration of an embodiment of a system for assembling a detail to a flexible member.
Figure 2:
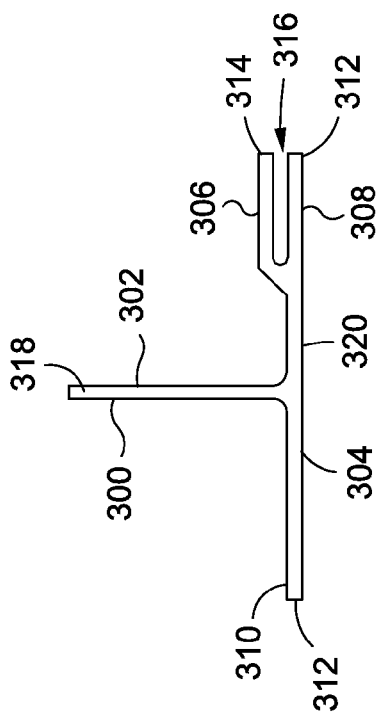
FIG. 2 is a cross-sectional view of an embodiment of the detail.

Referring now to the drawings wherein the showings are for purposes of illustrating various embodiments of the present disclosure, shown in FIG. 1 is an embodiment of a system 100 for assembling a detail 300 to a flexible member 400. As described in greater detail below, the system 100 advantageously provides a means for distortional clamping of the flexible member 400 to substantially conform the flexible member 400 to a contour of the detail 300 such that the detail 300 may be assembled to the flexible member 400. In the context of the present disclosure, the flexible member 400 comprises an aircraft wing panel 402 which is shown suspended by a hoist above the system 100 prior to clamping the flexile member 400 within the system 100. However, the system 100 may be configured for accommodating flexible members of any one of a variety of different sizes, shapes, and configurations, and is not limited to accommodating wing panels.

In the present disclosure, the detail 300 comprises a stiffener 302 or structural reinforcement configured as side-of-body chord 304 and which is shown in FIG. 1 suspended above the system 100 by a hoist. The detail 300 may be contoured or curved such as along a lengthwise direction, and may be fitted to an edge of the panel 402 (e.g., wing panel) following the distortional clamping of the panel 402 using the system 100 disclosed herein. However, the system 100 may be configured to accommodate details of any size, shape, and configuration, without limitation, and is not limited to accommodating details 300 such as the side-of-body chord 304 shown and described herein. Furthermore, the system 100 may be configured to simultaneously measure the detail contour 320 of a plurality of details 300, conformally clamp one or more flexible member 400 into the shape of the detail contour 320 of the plurality of details 300, and/or install the details 300 onto the one or more flexible member 400. The system 100 may comprise a standalone apparatus that may be located separate from a production line (not shown), or the system 100 may be included as a processing station in a production line.

Referring to 2, shown is a cross-section of the detail 300 which, as indicated above, is described in the present disclosure as a side-of-body chord 304 configured to be fitted to a member edge 410 of a panel 402. The detail 300 is shown having a bladed cross-sectional shape. The detail 300 may have a flange 310 and a web 318 that may extend lengthwise along the flange 310 between opposing detail ends 322. The detail 300 may have a detail inner surface 306 having a concave shape, and a detail outer surface 308 having a convex shape and defining a detail contour 320. The flange 310 may include opposing flange edges 312. One of the flange edges 312 is shown having a clevis configuration 314 defining a slot 316 that extends along a length of the detail 300. The slot 316 may be sized and configured to receive a member edge 410 of the panel 402 (i.e., the flexible member 400).

Figure 3:
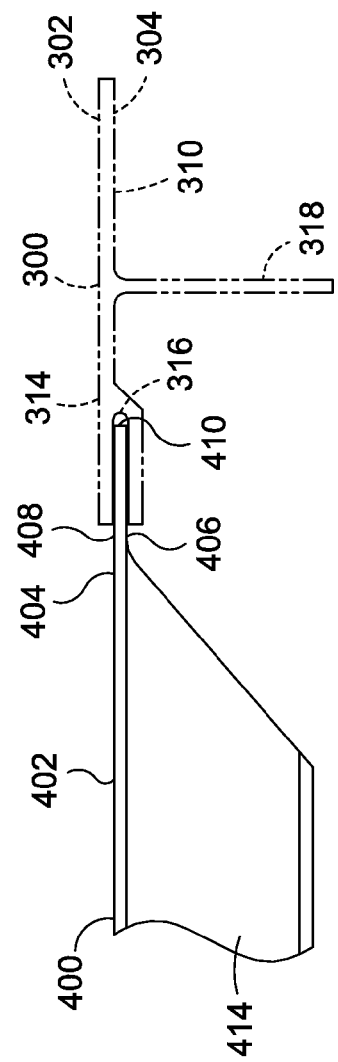
FIG. 3 is a cross-sectional view of an embodiment of the flexible member to which the detail may be mounted.

FIG. 3 shows a cross-section of a portion of the flexible member 400 with the detail 300 (shown in phantom) mounted to the member edge 410 following the distortional clamping of the flexible member 400 to conform to the shape of the detail contour 320. As indicated above, the flexible member 400 is described in the present disclosure as a panel 402 such as a wing panel of an aircraft wing. The panel 402 may include one or more stringers that may be integrally formed with or fixedly coupled to the panel 402. The panel 402 may have a member edge 410 over which the detail 300 may be fitted. The flexible member 400 may have a member inner surface 404 with a generally concave shape, and a member outer surface 406 with a generally convex shape and defining a member contour 408. The flexible member 400 may include the member edge 410 which is configured to be received within the slot 316 of the detail 300 as shown in FIG. 3.

It should be noted that the detail 300 may be configured to be mounted to any portion of the flexible member 400 after distortional clamping thereof, and is not limited to mounting over the member edge 410 of a panel 402 as shown in FIG. 3. For example, the detail inner surface 306 may be configured to mate to the member outer surface 406, or the detail outer surface 308 may be configured to mate to the member inner surface 404. Even further, any portion of the detail 300 may be configured to mount to any portion of the flexible member 400 when the flexible member 400 is distortionally clamped to conform to the detail contour 320. For example, the detail 300 may be configured to mount to the outer flanges (not shown) of the panel stringers 414 when the flexible member 400 is conformally clamped against the positioning pogos 152. The detail 300 and the flexible member 400 may be formed of metallic material, composite material such as fiber-reinforced polymer matrix material, or any combination of metallic material and composite material, or any other material.

Figure 4:
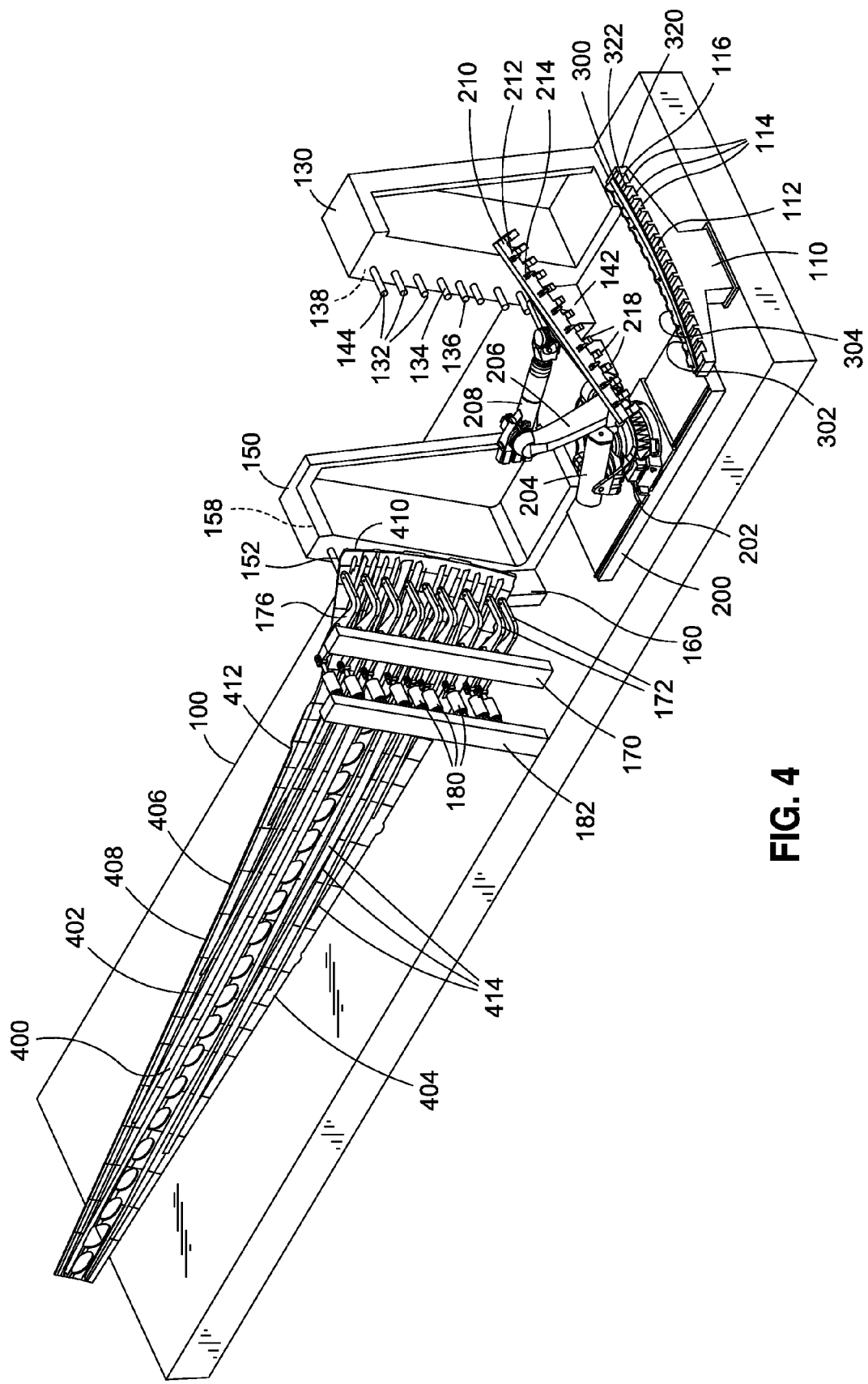
FIG. 4 is a perspective illustration of the system illustrating the flexible member and the detail initially positioned in the system.

Referring to FIG. 4, shown is the flexible member 400 positioned between the positioning pogos 152 and the clamping fingers 172. The detail 300 is shown supported on the holding fixture 110. The system 100 may be mounted to a supporting surface such as a shop floor of a production facility, or the system 100 may be supported by other means such as on a bench (not shown). The system 100 may include a holding fixture 110 (e.g., a staging table) for initially supporting the detail 300. The system 100 may additionally include a dimensional reader 130 having a plurality of reader pogos 132 for measuring and recording the detail contour 320 of the detail 300. An automated handling mechanism 200 may be included with the system 100 for automated handling of the detail 300. The automated handling mechanism 200 may comprise a robotic device configured to pick up, place, manipulate, and position the detail 300 in an automated or pre-programmed manner, or in a manually-controlled manner.

Figure 6:
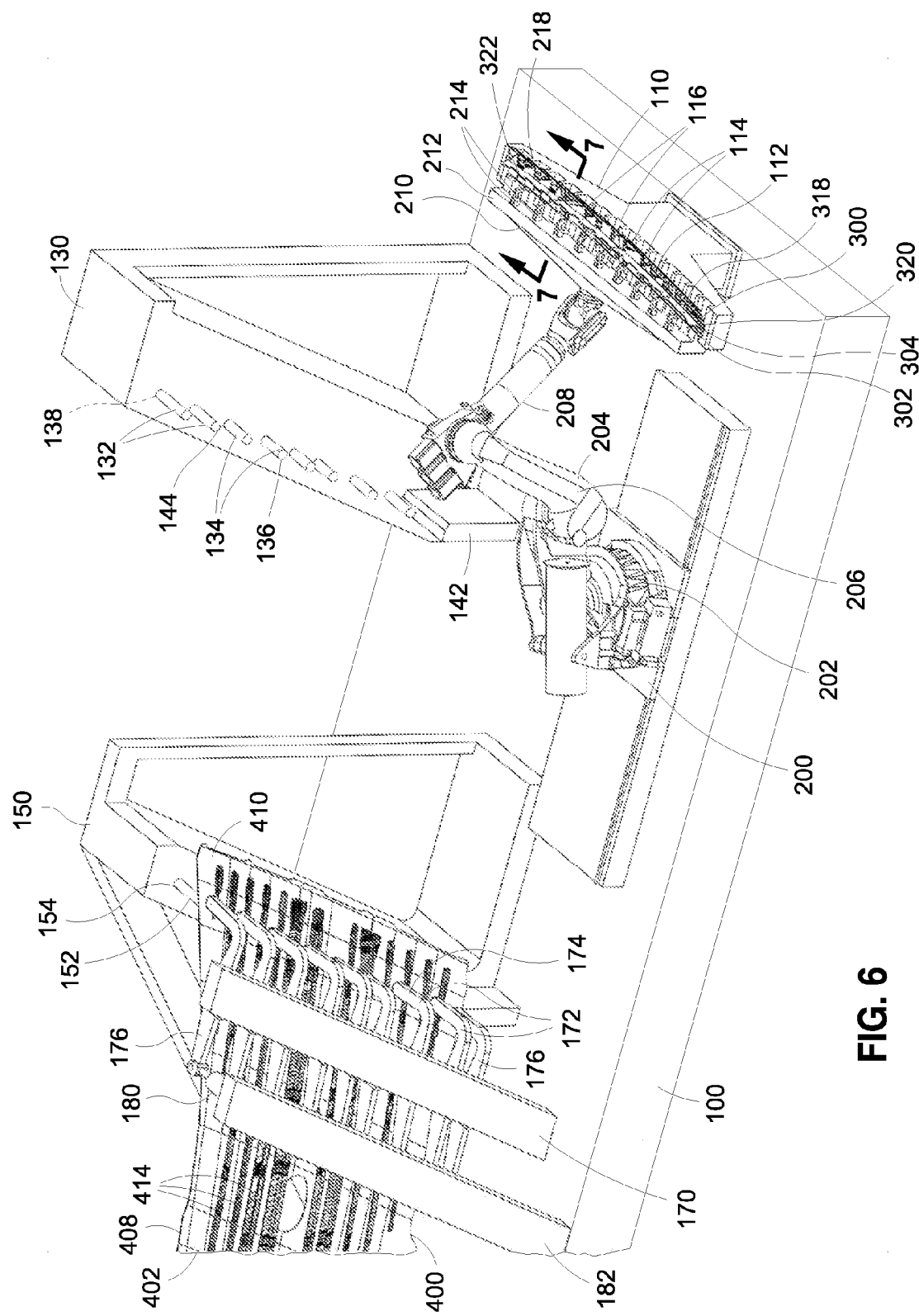
FIG. 6 is a perspective illustration of an automated handling mechanism engaging the holding fixture for picking up the detail.
Figure 14:
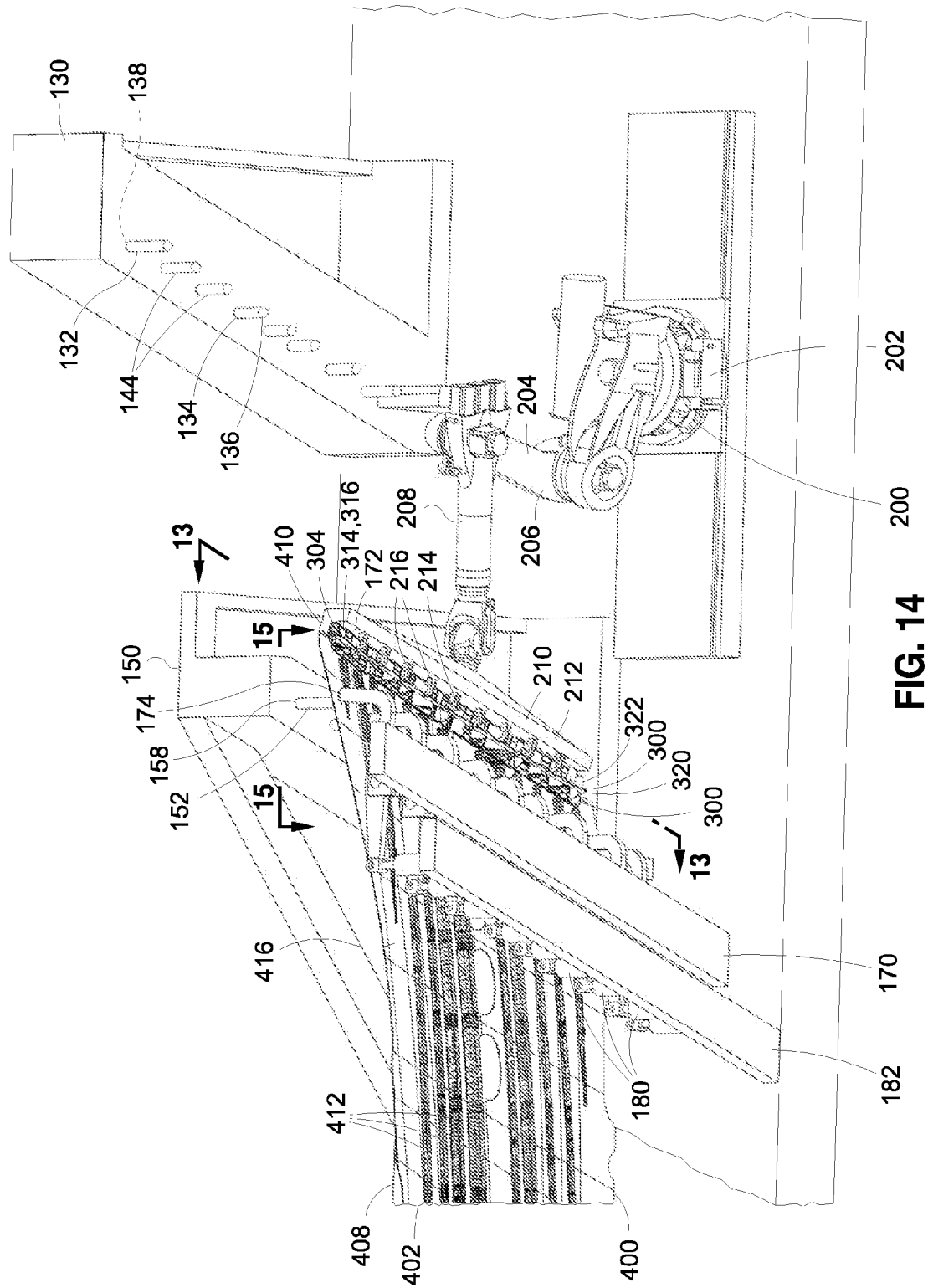
FIG. 14 is a perspective illustration of the automated handling mechanism installing the detail onto the member edge of the flexible member.

The automated handling mechanism 200 may perform operations such as picking up the detail 300 from the holding fixture 110, and positioning the detail 300 against the reader pogos 132 of the dimensional reader 130 for measuring the detail contour 320 (FIG. 6). However, the detail 300 may be manually moved from the holding fixture 110 to the dimensional reader 130 such as by using a hoist similar to the hoist illustrated in FIG. 1, or by using other means. The automated handling mechanism 200 may also move the detail 300 from the dimensional reader 130 to the flexible member 400 (as shown in FIG. 14) which may be clamped against a plurality of positioning pogos 152 of a positioning fixture 150. However, the detail 300 may be manually moved from the dimensional reader 130 to the flexible member 400 using a hoist similar to that which is illustrated in FIG. 1.

In FIG. 4, the plurality of positioning pogos 152 may be opposed by one or more clamping fingers 172 for clamping the flexible member 400 therebetween. The clamping fingers 172 may be mounted to a clamping fixture 170. The clamping fingers 172 may be actuated by one or more pogo actuators 158 that may be mounted to an actuator fixture 182. In an embodiment not shown, the clamping fixture 170 and the actuator fixture 182 may be separate, or may be combined into a single fixture (not shown). Advantageously, the positioning pogos 152 may receive reader pogo position data 148 from the dimensional reader 130, and may deflect (FIG. 11) the flexible member 400 into a contour that is complementary to the detail contour 320 so that the detail 300 may be assembled onto the flexible member 400.

In FIG. 4, the automated handling mechanism 200 may include a base 202 that may be rotatable and/or translatable relative to the shop floor, bench, or other surface to which the base 202 may be mounted. The automated handling mechanism 200 may include at least one arm 206, 208 that may be coupled to the base 202. For example, a first arm 206 may be coupled to the base 202 at a shoulder joint (not shown) between the first arm 206 and the base 202, and a second arm 208 may be coupled to the first arm 206 at an elbow joint (not shown) between the first arm 206 and the second arm 208. The arm may include an end effector 210 for manipulating the detail 300. The end effector 210 may include a carrier 212 which may be sized complementary to the detail 300. In the embodiment shown, the carrier 212 may have a generally L-shaped configuration and having a length that may be complementary to a length of the detail 300. The carrier 212 may include at least one jaw 216 for gripping or grasping the detail 300, or clamping the detail 300 against the carrier 212. The end effector 210 may be movable in any one of a variety of different directions and orientations. For example, the end effector 210 may be rotatable and/or pivotable about the end of the second arm 208 within a range of motion of up to approximately 360°. Furthermore, the end effector 210 may be extendable and retractable relative to the second arm 208, and may also be translatable in any one of a variety of directions relative to the end of the second arm 208.

Figure 5:
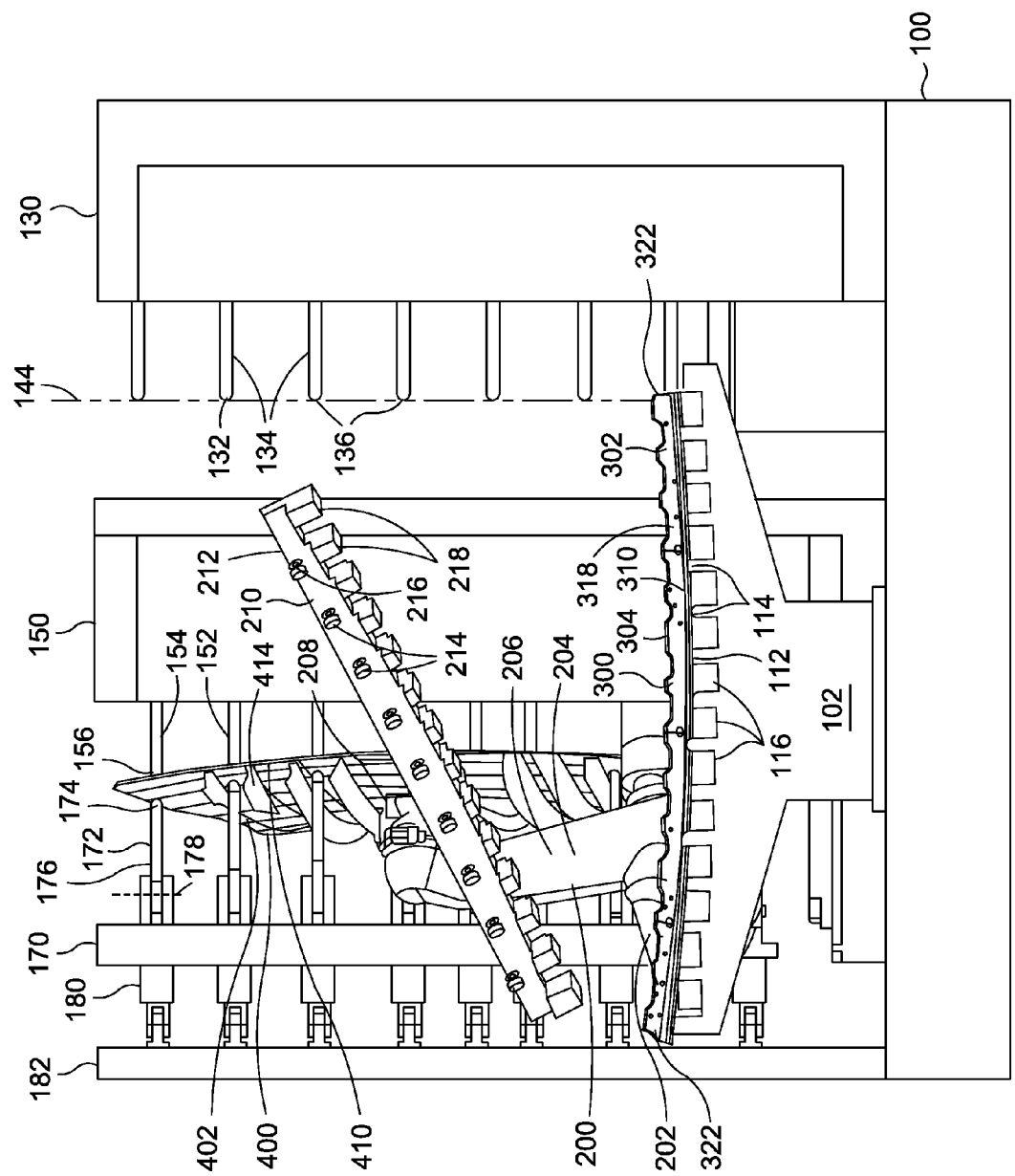
FIG. 5 is an end view of the system illustrating the detail supported on a holding fixture.

In FIG. 5, shown is an end view of the holding fixture 110 which may include a support surface 112 for initially supporting the detail 300. The support surface 112 may be contoured (e.g., curved) generally complementary to the detail contour 320. In an embodiment, the support surface 112 may be defined by a series of support pads 114 that may be separated by grooves 116. The support surface 112 and/or the support pads 114 may be configured to support the detail 300 in a predetermined orientation such that the end effector 210 may index to the detail 300 when the end effector 210 grasps or grips the detail 300 for picking up and moving the detail 300 from the holding fixture 110 to the dimensional reader 130. In an embodiment not shown, the holding fixture 110 may include one or more upwardly-protruding tabs or stops located on or around a perimeter (mot shown) of the support surface 112 and against which the detail 300 may be butted as a means to index the detail 300 to the holding fixture 110.

In FIG. 6, shown is a perspective view of the end effector 210 engaging the holding fixture 110 for picking up the detail 300. The grooves 116 in the holding fixture 110 may be sized and configured to receive a corresponding quantity of tongues 218 that may be formed on the carrier 212. The engagement of the tongues 218 into the grooves 116 may provide a means to index the end effector 210 to the holding fixture 110, which in turn may result in indexing the end effector 210 to the detail 300 if the detail 300 is indexed to the holding fixture 110.

Figure 7:
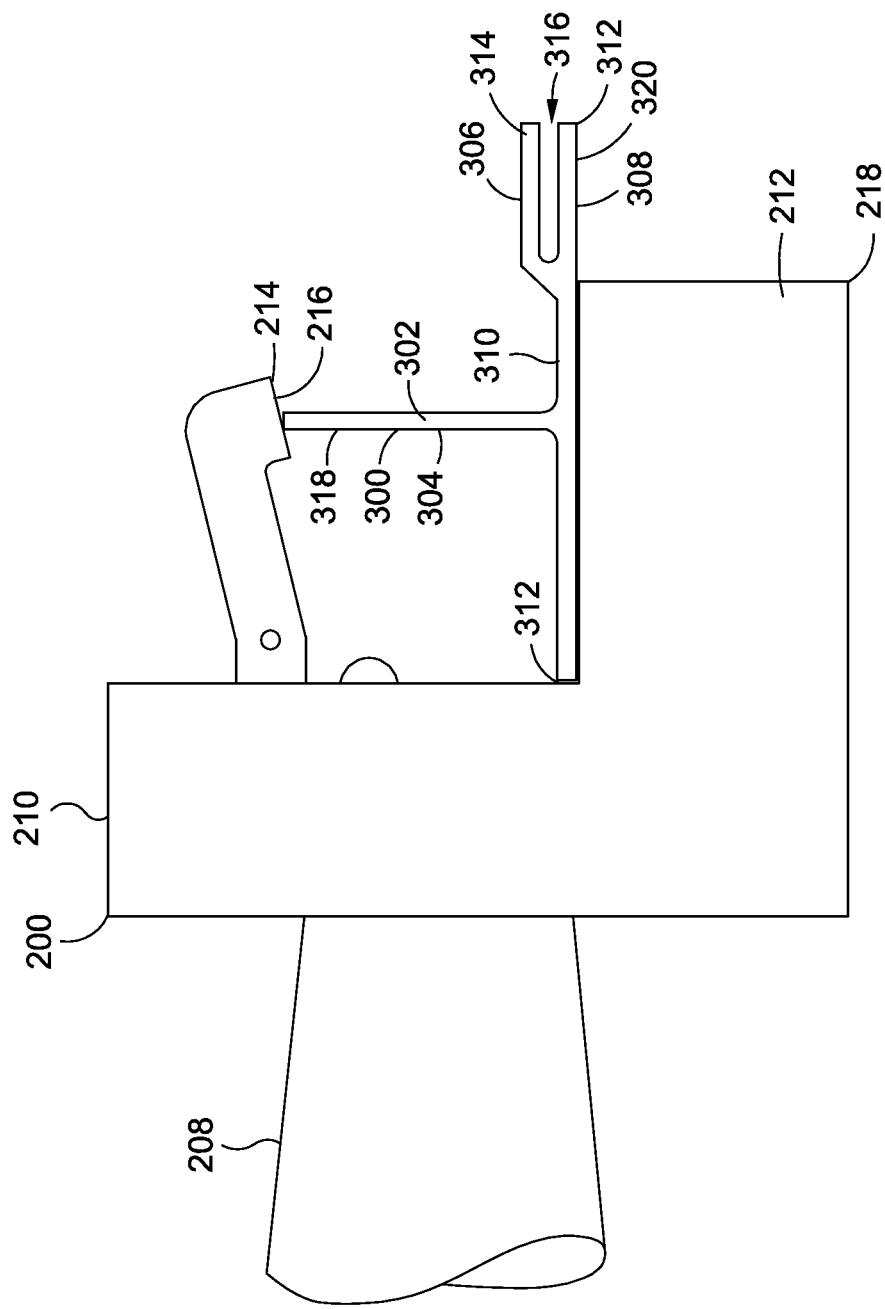
FIG. 7 is a cross-sectional illustration of an embodiment of an end effector of the automated handling mechanism taken along line 7 of FIG. 6 and illustrating the detail clamped to the end effector.

In FIG. 7, shown is cross-section of the end effector 210. The carrier 212 may include one or more gripping mechanisms for grasping and/or retaining the detail 300. In an embodiment, each one of the gripping mechanisms 214 may be configured as a jaw 216 such as a spring-loaded jaw that may be pivotable about a pivoting point on the carrier 212. The jaws 216 may be passively or actively engaged to grip the detail 300. For example, the jaws 216 may be configured to bear against an upper edge of the web 318 to clamp the detail 300 against the lower portion of the carrier 212. As may be appreciated, the gripping mechanism 214 may be provided in any one of a variety of different sizes, shapes, and configurations for gripping the detail 300, and is not limited to the jaw 216 configuration shown in FIG. 7 shown clamping the detail 300 against the carrier 212.

Figure 8:
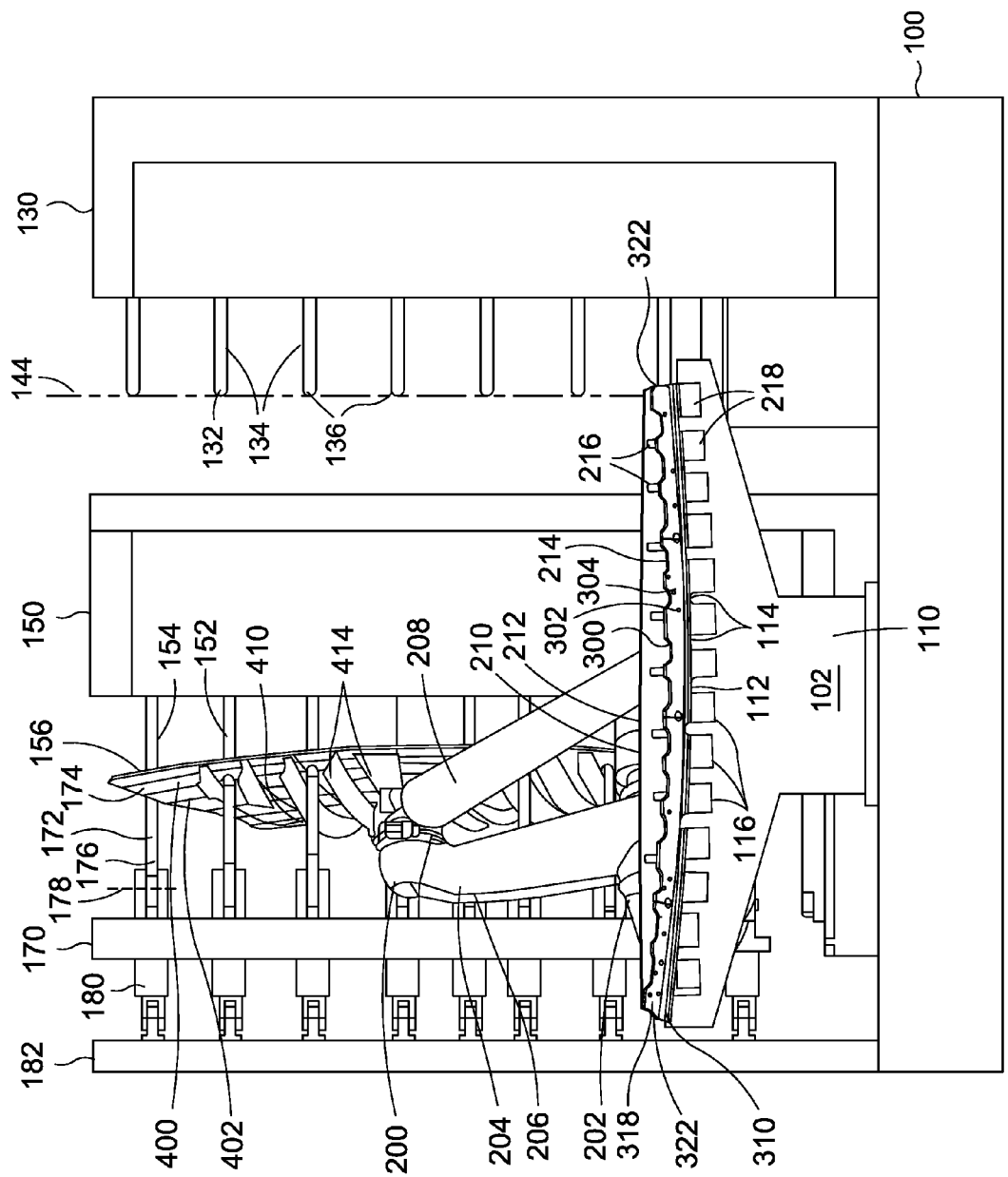
FIG. 8 is an end view of the system illustrating the end effector indexed to the holding fixture and engaging the detail.

FIG. 8 shows the end effector 210 engaging the holding fixture 110. The tongues 218 of the end effector 210 are shown engaged within the grooves 116 of the holding fixture 110 to effectively index the end effector 210 to the holding fixture 110. However, the end effector 210 and the holding fixture 110 may be provided with any one of a variety of different structural arrangements for indexing the end effector 210 to the holding fixture 110, and are not limited to the tongue and groove arrangement shown in the figures. The carrier 212 may include a plurality of jaws 216 which may be configured to engage the web 318. The jaws 216 may be spring-loaded so that the jaws 216 clamp the detail 300 against the lower portion of the carrier 212. However, as indicated above, the end effector 210 may be provided with any one of a variety of different mechanisms for gripping or grasping the detail 300.

Figure 9:
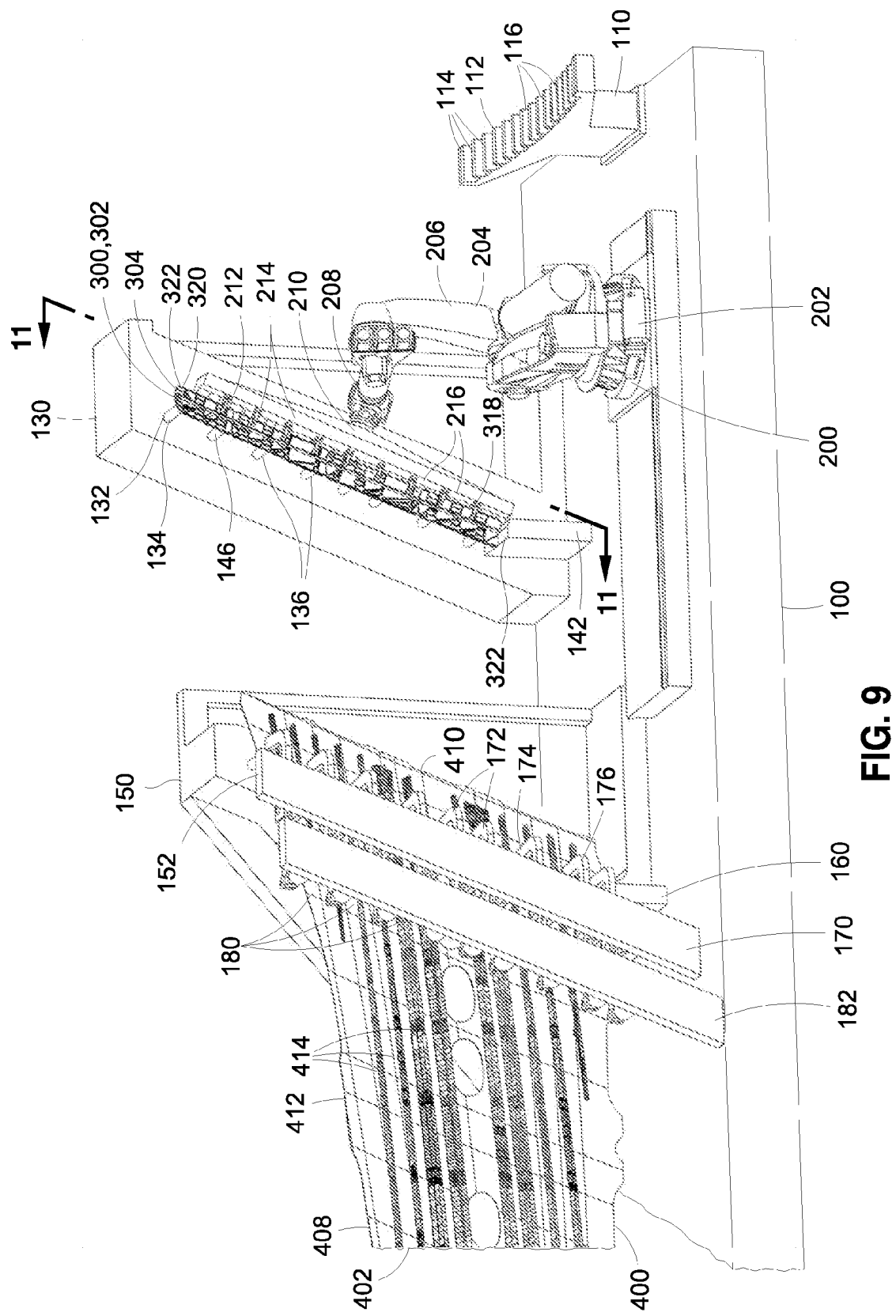
FIG. 9 is a perspective illustration of the automated handling mechanism positioning the detail against a plurality of reader pogos of a dimensional reader.

FIG. 9 shows the automated handling mechanism 200 positioning the detail 300 relative to or against the plurality of reader pogos 132 of the dimensional reader 130. In this regard, the automated handling mechanism 200 may be configured to force the detail 300 against the reader pogos 132 causing the reader pogos 132 to be axially moved or displaced so that the detail contour 320 may be measured. The detail end 322 may be supported on an end stop 142 that may be located near the dimensional reader 130. The end stop 142 may index the position of the detail 300 relative to the reader pogos 132. In addition, the end stop 142 may stabilize the detail 300 against vibration that may otherwise be imparted to the detail 300 from the automated handling mechanism 200 (e.g. robotic device) to which the detail 300 may be engaged while the detail contour 320 is being measured by the reader pogos 132.

Although the reader pogos 132 are linearly and vertically-arranged, and are oriented in the same general direction relative to one another as shown in FIG. 9, the reader pogos 132 may be arranged in any configuration and in different orientations, without limitation, and are not limited to a linear vertical arrangement with the same general orientation as one another. For example, the reader pogos 132 may be horizontally arranged or arranged in other directions. In addition, the reader pogos 132 may be non-linearly arranged. For example, for a detail 300 that having a non-straight configuration, the reader pogos 132 may be arranged in a non-straight configuration such or in an arrangement that is complementary to the shape of the detail 300. Furthermore, the reader pogos 132 are not limited to a one-dimensional arrangement such as a linear, non-straight arrangement. In an embodiment not shown, the reader pogos 132 may be provided in a two-dimensional arrangement as a matrix of reader pogos 132 such as for measuring the contour of a detail 300 having a complex curvature.

Referring to FIG. 10, shown are the reader pogos 132 in an original reader pogo position 144 prior to the detail 300 being positioned against the reader pogos 132 and axially moving the reader pogos 132. Each one reader pogos 132 may have a reader pogo shaft 134 that may terminate at a reader pogo free end 136. In the original reader pogo position 144, each one of the free ends may terminate at the same location. However, the reader pogos 132 may be configured such that the reader pogo free ends 136 terminate at different locations when the reader pogos 132 are in the original reader pogo position 144. In the embodiment shown, each one of the reader pogos 132 may have a passive configuration. For example, the reader pogos 132 may protrude outwardly from the dimensional reader 130 and may be biased toward the original reader pogo position 144 by a spring 140 such as a compression spring that may be coupled to an end of the reader pogo 132.

In FIG. 10, each one of the reader pogos 132 may be coupled to a linear displacement transducer 138 for measuring axial displacement or axial position of the reader pogo 132. In an embodiment, the linear displacement transducers 138 may comprise relatively low voltage transducers and may be configured to record reader pogo position data 148. In an embodiment, the linear displacement transducers 138 may be configured to measure the axial position of the reader pogos 132 within a tolerance band of approximately ±0.010 inch or smaller (e.g., ±0.001 inch) to provide the ability to measure the detail contour 320 to within ±0.030 inch. However, the reader pogos 132 may measure the reader pogo axial position within a tolerance band of greater than approximately ±0.010 inch. In an embodiment, the reader pogos 132 may have an active configuration wherein the reader pogos 132 may be powered by reader pogo actuators (not shown) configured to move the reader pogos into contact with the detail 300 when positioned by the automated handling mechanism 200 such as when the detail is positioned to within a predetermined distance (e.g., approximately 1.0 inch) of the free ends of the reader pogos 132. A measurement device (e.g., a linear displacement transducer 138) may be coupled to the actively-configured reader pogos 132 for measuring the axial positions thereof and generating the reader pogo position data 148 representative of the detail contour 320.

In FIG. 11, shown is the handling mechanism 200 positioning the detail 300 against the reader pogos 132 such that the reader pogo free ends 136 are positioned in contacting relation with the detail 300 in a manner causing axial displacement of the reader pogos 132. In an embodiment, one or more of the reader pogo free ends 136 may be provided with a protective cover or coating to prevent marring or damage to the detail 300. Upon contact of the reader pogo free ends 136 with the detail 300, the springs 140 may be compressed due to the axial displacement of the reader pogos 132. The linear displacement transducers 138 are configured to measure the axial position of the reader pogos 132. The axial displacement measurements of the linear displacement transducers 138 may comprise the reader pogo position data 148 representing the detail contour 320. The reader pogo position data 148 may represent the relative axial positions of the reader pogos 132 with respect to one another. Alternatively, the reader pogo position data 148 may represent the absolute axial positions of the reader pogos 132 relative to the original reader pogo positions 144.

Figure 12:
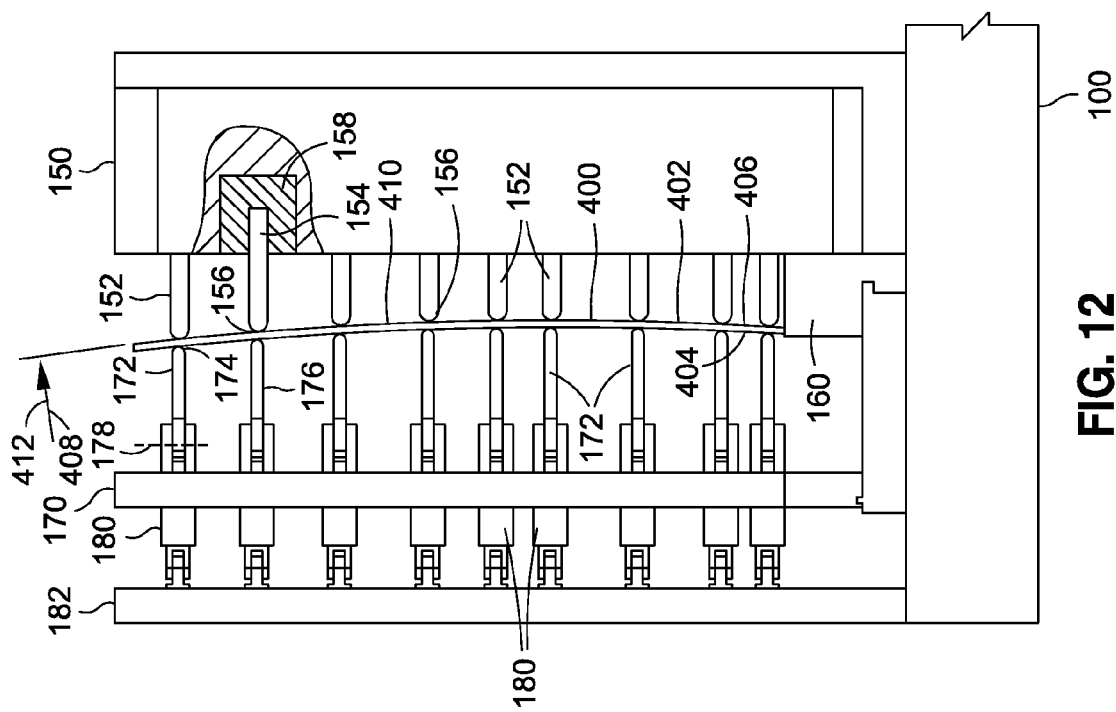
FIG. 12 is an end view of the flexible member clamped between a plurality of positioning pogos and a plurality of clamping fingers and wherein the flexible member has a member contour.

Referring to FIG. 12, shown is an end view of the flexible member 400 having a member contour 408 which may be different than the detail contour 320, at least in the location on the flexible member 400 wherein the detail 300 is to be mounted. In an embodiment, the flexible member contour 408 may represent an intended design engineering contour 412 of the flexible member 400. The flexible member 400 may be clamped between a plurality of positioning pogos 152 and a plurality of clamping fingers 172. Each one of the positioning pogos 152 may have a positioning pogo shaft 154 terminating at a positioning pogo free end 156. As indicated above, the positioning pogos 152 may extend from the positioning fixture 150. In an embodiment, the positioning pogos 152 may be linearly and/or vertically arranged in a manner similar to the linearly vertical arrangement of the reader pogos 132. However, the positioning pogos 152 may be provided in any arrangement, without limitation. For example, the positioning pogos 152 may be provided in a horizontal arrangement, in a two-dimensional arrangement, or in other arrangements as may be required to conform the flexible member 400 into the shape of the detail contour 320.

In an embodiment, the arrangement of the positioning pogos 152 may substantially correspond to or match the arrangement of the reader pogos 132. For example, the positioning pogos 152 may be provided in the same quantity, relative spacing, and orientation as the reader pogos 132. By providing the positioning pogos 152 in the same arrangement as the reader pogos 132, the reader pogo position data 148 may be transferred the positioning pogos 152 on a one-to-one basis to without the need for a multiplier to account for differences in the arrangement of the reader pogos 132 and the positioning pogos 152.

In FIG. 12, the positioning pogos 152 may be coupled to one or more pogo actuators 158. The pogo actuators 158 may be configured to actively position the positioning pogos 152 to correspond to the reader pogo position data 148 received from the dimensional reader 130. The pogo actuators 158 may be provided in any configuration for axially driving the positioning pogos 152 including electromechanical actuators, hydraulic actuators, pneumatic actuators, and/or other types of actuators for axially positioning the positioning pogos 152. The positioning pogo free ends 156 may optionally be covered with a protective cover or coating to prevent marring of the surface of the flexible member 400 as mentioned above with regard to the reader pogos 132.

In FIG. 12, the system 100 may include one or more clamping fingers 172 for clamping the flexible member 400 against the reader pogos 132. In the embodiment shown, each one of the positioning pogos 152 may have a clamping finger 172 positioned in axial alignment with the positioning pogo 152. One or more of the clamping fingers 172 may be coupled to a clamp actuator 180 which may be configured to apply force against the positioning pogos 152 to mechanically clamp the flexible member 400 between the positioning pogos 152 and the clamping fingers 172. In the embodiment shown, each clamping finger 172 may extend from or may be coupled to a pivot arm 176 as described in detail below. However, the clamping fingers 172 may be directly coupled to a clamp actuator 180.

Figure 13:
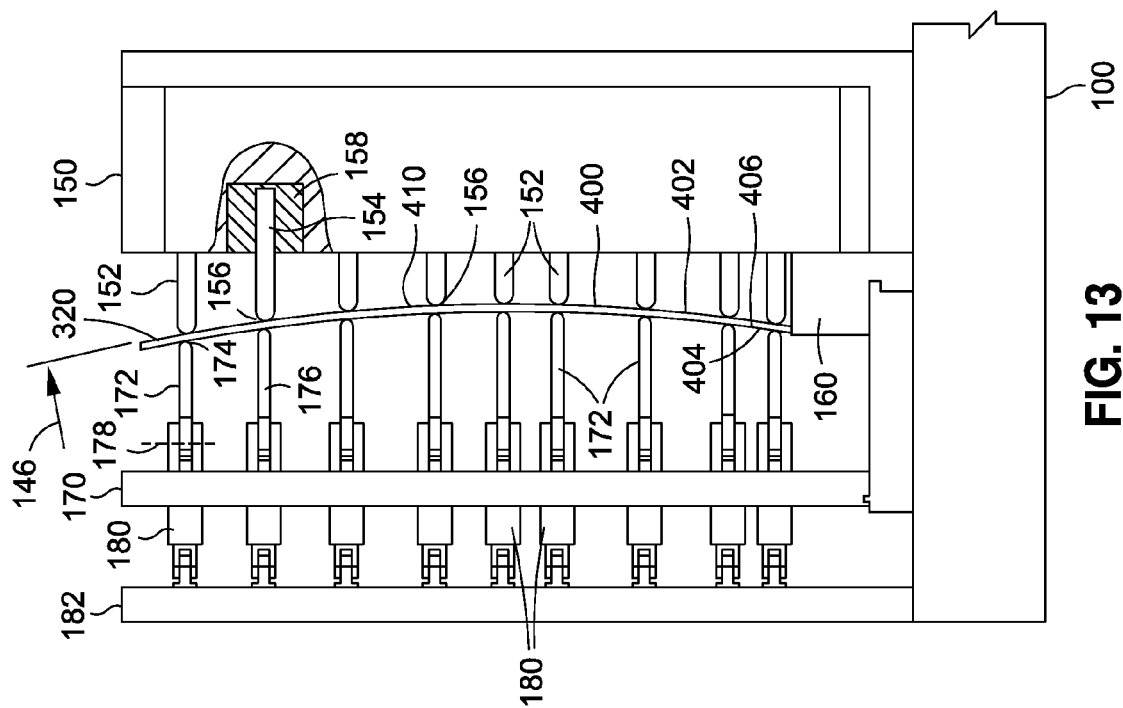
FIG. 13 is an end view of the flexible member taken along line 13 of FIG. 14 and illustrating the axial displacement of the positioning pogos and the deflection of the flexible member to assume a contour that is complementary to the detail contour as measured by the reader pogos.

In FIG. 13, shown is an end view of the flexible member 400 with the positioning pogos 152 axially displaced into the detail contour 320 based on the reader pogo position data 148 received from the dimensional reader 130. In this regard, the flexible member 400 is shown conformally clamped between the positioning pogos 152 and the clamping fingers 172. During axial displacement of the positioning pogos 152 from the member contour 408 (FIG. 12) to the detail contour 320 (FIG. 13), the clamping fingers 172 may be configured to axially move with the positioning pogos 152 and maintain a predetermined clamping force on the flexible member 400 so that the flexible member 400 remains clamped between the positioning pogos 152 and the clamping fingers 172.

In FIG. 13, the positioning pogos 152 are configured to deflect the flexible member 400 into the detail contour 320 or into a contour that substantially duplicates the detail contour 320, at least in the location where the detail 300 is to be mounted to the flexible member 400. For example, the flexible member 400 is loaded into the system 100 such that the member edge 410 of the panel 402 is clamped between the positioning pogos 152 and the clamping fingers 172 which may allow the member edge 410 to be deflected into the detail contour 320. However, the flexible member 400 may be loaded into the system 100 such that any location along the flexible member 400 may be deflected by the positioning pogos 152 and clamping fingers 172 to substantially match the detail contour 320. Each one of the clamping fingers 172 may be configured to apply less axial force on the flexible member 400 than the positioning pogos 152 to avoid further axial displacement of the positioning pogos 152 outside of the detail contour 320.

Referring to FIG. 14, shown is the end effector 210 of the automated handling mechanism 200 installing the detail 300 onto the member edge 410 (FIG. 3) of the flexible member 400 to form a structural assembly 416. The automated handling mechanism 200 may be configured to assemble the detail 300 onto the flexible member 400 while the positioning pogos 152 maintain the flexible member 400 in the shape of the detail contour 320. The automated handling mechanism 200 may be configured to index to the flexile member such that the detail 300 is mounted to the member edge 410 at a desired location on the member edge 410. For example, although not shown, the end effector 210 may be configured to support the detail end 322 on member support 160 that may located near the positioning pogos 152 and which may be indexed to the flexible member 400. In an embodiment, the positioning pogos 152 may be configured to be axially adjustable to within a predetermined tolerance band that may allow the detail 300 to be fitted over the member edge 410. For example, the positioning pogos 152 may be axially adjustable to within approximately ±0.010 inch or smaller (e.g., to within approximately ±0.001 inch), although tolerances larger than ±0.010 inch are contemplated.

Figure 15:
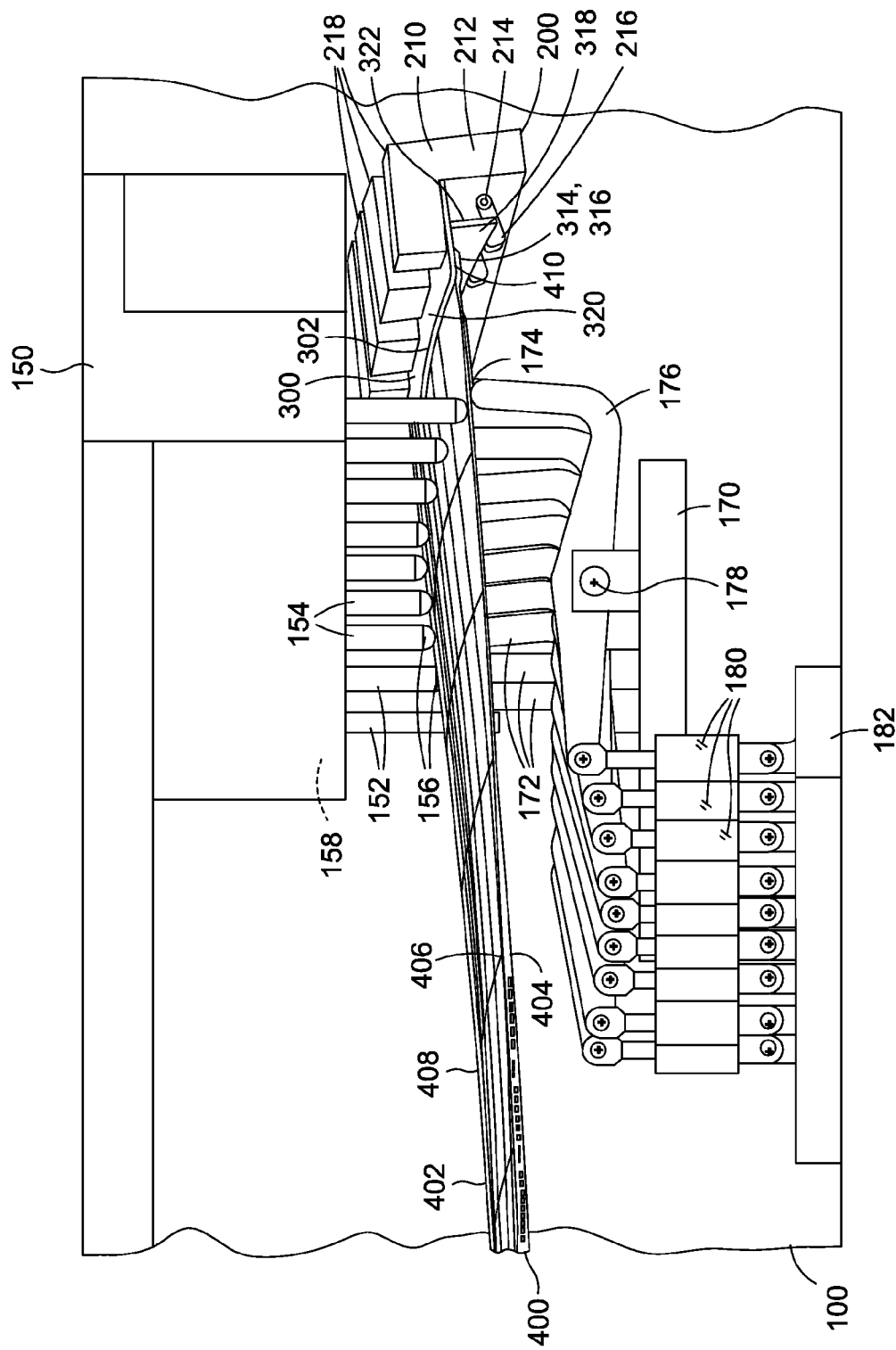
FIG. 15 is a top view of the system taken along line 15 of FIG. 14 and illustrating the detail being installed on the member edge of the flexible member.

FIG. 15 shows a top view of the detail 300 being installed on the member edge 410 and illustrating the clamping thereof between the positioning pogo free ends 156 and the finger ends 174 of the clamping fingers 172. In an embodiment, each one of the clamping fingers 172 may be integrally formed with or coupled to a pivot arm 176. Each one of the pivot arms 176 may be pivoted about a clamp pivot 178 that may be mounted to a clamping fixture 170. The pivot arm 176 may be coupled to a clamp actuator 180. The clamp actuator 180 may be coupled to an actuator fixture 182 that may be separately formed from the clamping fixture 170, or which may be integrated with the clamping fixture 170 into a single fixture (not shown). As indicated above, the clamp actuator 180 may be provided in any one of a variety of different configurations. Furthermore, the clamping finger 172 is not limited to a pivoting arrangement as shown in FIG. 15, and may be provided in an axially-moving arrangement similar to the arrangement described above for the positioning pogo 152.

After the detail 300 is assembled to the flexible member 400, the detail 300 may be temporarily fastened to the flexible member 400 to allow the end effector 210 to release the detail 300. The clamping fingers 172 and the positioning pogos 152 may also unclamp and release the flexible member 400. The structural assembly 416 (i.e., the detail 300 mounted to the flexible member 400) may be moved to another location such as to a separate tooling fixture (not shown) or to a station (not shown) in a production line.

Alternatively, after the detail 300 is assembled to the flexible member 400, the positioning pogos 152 may be configured to deflect the flexible member 400 into an engineering contour 412. In this regard, the clamping fingers 172 may be configured to axially move with the positioning pogos 152 to maintain a desire clamping force on the flexible member 400 which remains clamped between the positioning pogos 152 and the clamping fingers 172. After the flexible member 400 is moved to an engineering contour 412, the detail 300 may be mechanically fastened and/or adhesively bonded to the flexible member 400. The detail 300 may be temporarily fastened to the flexible member 400 while the flexible member 400 is moved into the engineering contour 412. Alternatively, the end effector 210 may be configured to support the detail 300 on the flexile member while the flexible member 400 is moved into the engineering contour 412, after which the detail 300 may be permanently fastened and/or adhesively bonded to the flexile member.

Figure 16:
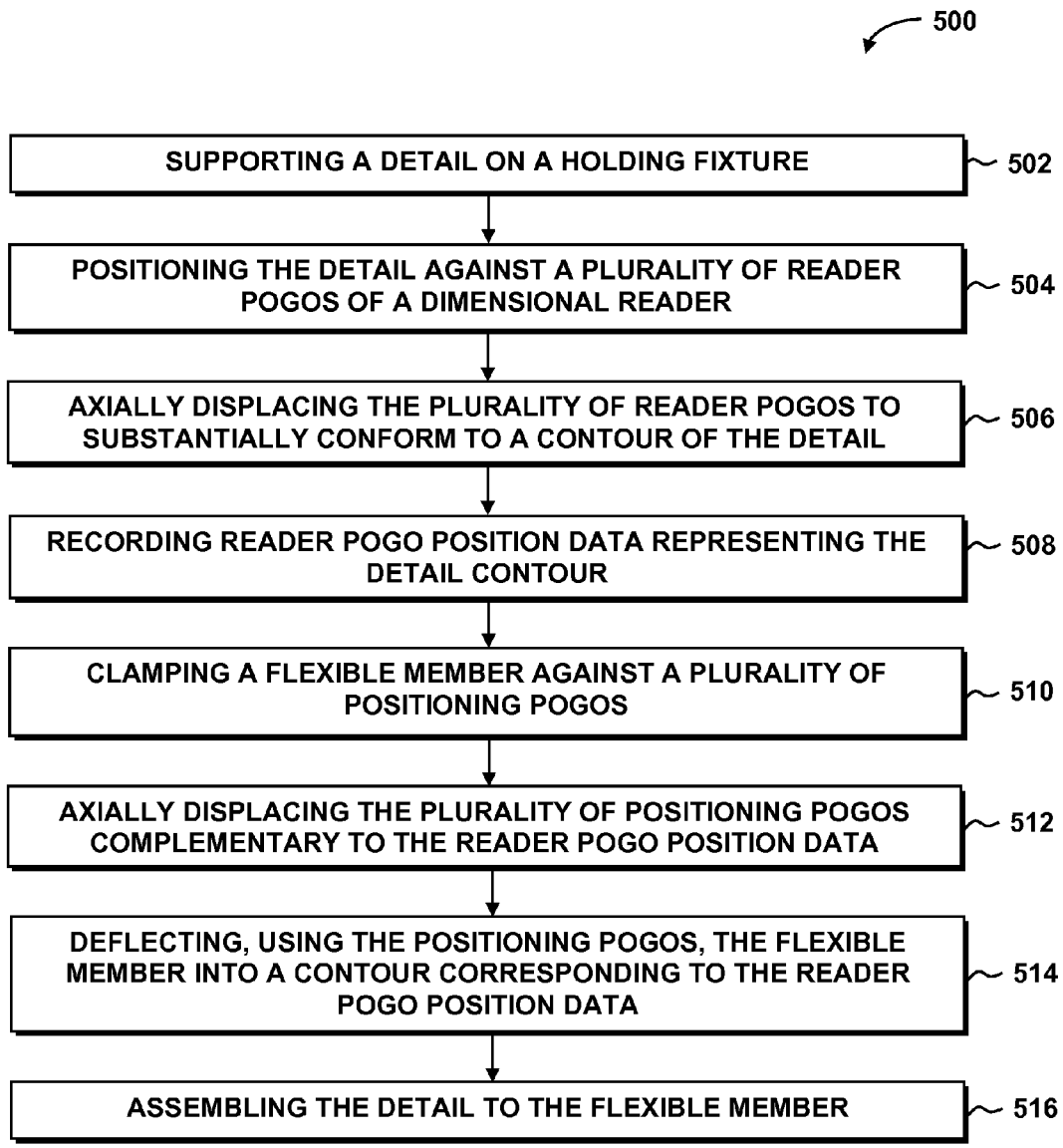
FIG. 16 is an illustration of an embodiment of a method of assembling a detail to a flexible member.

Referring to FIG. 16, shown is a method 500 of assembling a detail 300 to a flexible member 400. Step 502 of the method 500 may include supporting the detail 300 on a holding fixture 110 as shown in FIGS. 4-6. The method may include indexing the detail 300 to the holding fixture 110 such as by using one or more tabs (not shown) that may be included with the holding fixture 110 and against which the detail 300 may be butted. The method may further include indexing the end effector 210 to the holding fixture 110 such as by using the tongue 218 and groove 116 arrangement shown in FIG. 5 and which may allow the detail 300 to index to the end effector 210.

Step 504 of the method 500 of FIG. 16 may include positioning the detail 300 against a plurality of reader pogos 132 of a dimensional reader 130. In an embodiment, the detail 300 may be picked up from the holding fixture 110 and positioned against the reader pogos 132 using the automated handling mechanism 200. In this regard, the method may include clamping the detail 300 to the end effector 210 of the automated handling mechanism 200 such as by using the gripping mechanism 214 shown in FIG. 7, or using another suitable gripping mechanism.

Step 506 of the method 500 of FIG. 16 may include axially displacing a plurality of reader pogos 132 to substantially conform to a detail contour 320. As shown in FIGS. 10-11, the reader pogos 132 may be axially displaced from an original reader pogo position 144 (FIG. 10) into a displaced reader pogo position 146 (FIG. 11). As indicated above, each one of the reader pogos 132 may be spring-biased by a compression spring 140 that may be compressed when the detail 300 bears against the reader pogos 132. Each reader pogo 132 may be coupled to a linear displacement transducer 138 or other suitable device for measuring axial displacement of a reader pogo 132. Alternatively, the reader pogos 132 may be actively displaced to extend or retract from the original reader pogo position 144 such that the reader pogos 132 are placed in contact with the detail 300. As indicated above, the method may include supporting the detail 300 on an end stop 142 to prevent or reduce vibration of the detail 300 as may be imparted by the automated handling mechanism 200.

Step 508 of the method 500 of FIG. 16 may include measuring the axial displacement of the reader pogos 132. For example, the method may include using the linear displacement transducers 138 coupled to the reader pogos 132 to measure and record the axial position of each one of the reader pogos 132. The reader pogo position data 148 may represent the axial positions of the reader pogos 132. In this regard, the reader pogo position data 148 may represent the detail contour 320 when the reader pogo free ends 136 are in contact with the detail 300.

Step 510 of the method 500 of FIG. 16 may include clamping the flexible member 400 against a plurality of positioning pogos 152 as shown in FIG. 12. In this regard, the method may include positioning the flexible member 400 between the positioning pogos 152 and the clamping fingers 172. In an embodiment shown in FIG. 12, each one of the positioning pogos 152 may have a clamping finger 172 located on a side of the flexible member 400 directly opposite to the positioning pogos 152 and/or in axial alignment with the positioning pogos 152. The method may include supporting the flexible member 400 using one or more member supports 160 which may be sized and configured to index the flexible member 400 to the positioning pogos 152.

Step 512 of the method 500 of FIG. 16 may include axially displacing the positioning pogos 152 complementary to the axial displacement of the reader pogos 132. In this regard, the method may include transmitting the reader pogo position data 148 from the dimensional reader 130 to the positioning fixture 150. The reader pogo position data 148 may be provided to the pogo actuators 158 that may be mounted to the positioning fixture 150. In an embodiment, the positioning pogos 152 may be arranged in one-to-one correspondence with the arrangement of the reader pogos 132. The one-to-one correspondence may allow for relative axial displacement of the positioning pogos 152 in a manner substantially similar to the relative axial displacement of the reader pogos 132.

Step 514 of the method 500 of FIG. 16 may include deflecting the flexible member 400 into a contour corresponding to the reader pogo position data 148. In this regard, the method may include using the positioning pogos 152 to substantially conform the flexible member 400 into a contour that is complementary to the detail contour 320 as shown in FIG. 13.

Step 516 of the method 500 of FIG. 16 may include assembling the detail 300 to the flexible member 400 to form a structural assembly 416 while the flexible member 400 is clamped substantially conformal to the detail contour 320. In an embodiment, the automated handling mechanism 200 may be used to move the detail 300 from the dimensional reader 130 to the flexible member 400. The end effector 210 may be configured to mount the detail 300 onto the member edge 410 of the flexible member 400 as shown in FIG. 14.

In a further embodiment not shown, the method may include releasing the detail 300 from the handling mechanism 200 after the detail 300 is mounted to the flexible member 400. The method may include axially displacing the positioning pogos 152 to drive the flexible member 400 to an engineering contour 412 while the clamping fingers 172 maintain a clamping force on the flexible member 400. The method may additionally include fixedly coupling the detail 300 to the flexible member 400 such as by mechanical fastening and/or adhesively bonding the detail 300 to the flexible member 400 while the flexile member 400 is held in the engineering contour 412.

Figure 17:
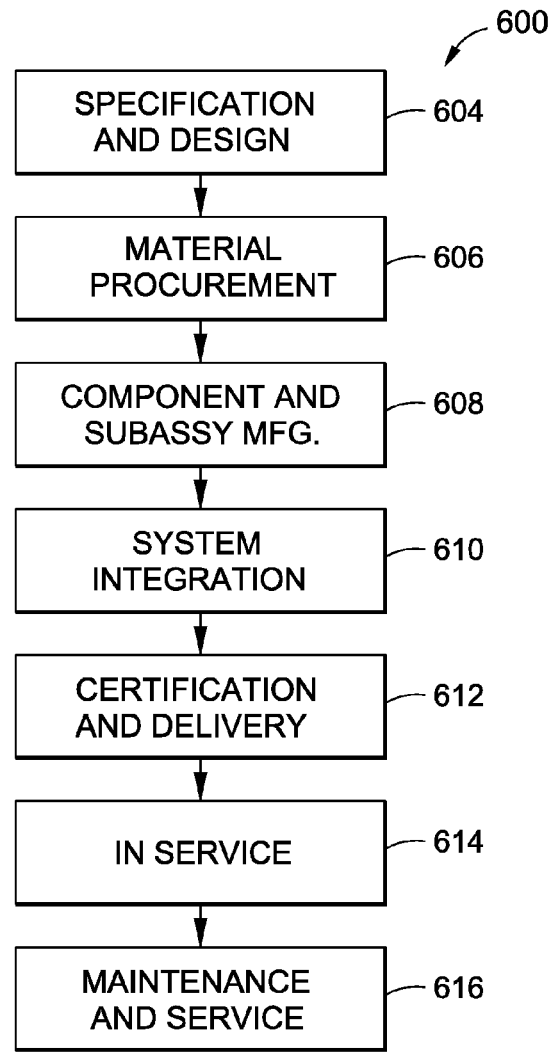
FIG. 17 is a flow diagram of an aircraft manufacturing and service methodology.
Figure 18:
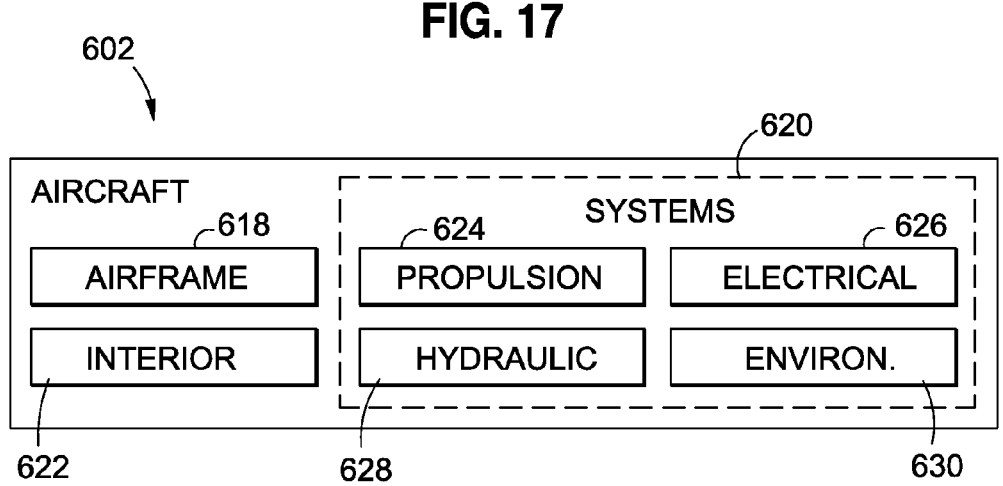
FIG. 18 is a block diagram of an aircraft

Referring to FIGS. 17-18, configurations of the disclosure may be described in the context of an aircraft manufacturing and service method 600 as shown in FIG. 17, and an aircraft 602 as shown in FIG. 18. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on)

Each of the processes of exemplary method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 18, the aircraft 602 produced by exemplary method 600 may include an airframe 618 with a plurality of system 620 and an interior 622. Examples of high-level system 620 include one or more of a propulsion system 624, an electrical system 626, a hydraulic system 628, and an environmental system 630. Any number of other systems may be included. Although an aerospace example is shown, the principles of the disclosure may be applied to other industries, such as the automotive industry.

Apparatus and methods configured herein may be employed during any one or more of the processes of the aircraft manufacturing and service method 600. For example, components or subassemblies corresponding to production process 608 may be fabricated or manufactured in a manner similar to components or subassemblies produced while the aircraft 602 is in service 614. Also, one or more apparatus configurations, method configurations, or a combination thereof may be utilized during the production processes 608 and 610, for example, by expediting assembly of or reducing the cost of an aircraft 602. Similarly, one or more of apparatus configurations, method configurations, or a combination thereof may be utilized while the aircraft 602 is in service, for example and without limitation, to maintenance and service 616.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A system for distortional clamping of a flexible member, comprising:
    a dimensional reader having a plurality of reader pogos being axially movable into contacting relation with a detail and configured to measure a detail contour and record reader pogo position data representative of the detail contour;
    a positioning fixture physically separated from the dimensional reader and having a plurality of positioning pogos configured to have a flexible member clamped thereagainst; and
    an automated handling mechanism having an end effector configured to position the detail against the reader pogos in a manner axially displacing the reader pogos, wherein the plurality of positioning pogos are configured to receive the reader pogo position data from the dimensional reader and are axially movable to deflect the flexible member into a contour complementary to the detail contour while the detail is assembled to the flexible member.

2. The system of claim 1, wherein:
the positioning fixture has at least one clamping finger configured to mechanically clamp the flexible member between the plurality of positioning pogos and the at least one clamping finger.

3. The system of claim 1, further comprising:
an automated handling mechanism having an end effector configured to position the detail against the reader pogos in a manner axially displacing the reader pogos.

4. The system of claim 1, further comprising:
a holding fixture configured to support the detail; and the end effector being configured to index to the holding fixture and pick up the detail therefrom.

5. The system of claim 4, wherein:
the holding fixture includes a support surface having one or more grooves separating a series of support pads configured to support the detail; and
the end effector having a plurality of tongues configured to engage the grooves to index the end effector to the holding fixture.

6. The system of claim 4, wherein:
the holding fixture includes one or more tabs located on a perimeter of a support surface against which the detail is butted to index the detail to the holding fixture.

7. The system of claim 1, further comprising:
a linear displacement transducer coupled to a reader pogo and being configured to measure an axial position of the reader pogo.

8. The system of claim 1, further comprising:
a pogo actuator coupled to a positioning pogo and being configured to axially position the positioning pogo complementary to the detail contour.

9. The system of claim 8, wherein:
the positioning pogos actively position the positioning pogos to correspond to reader pogo position data received from the dimensional reader.

10. The system of claim 8, wherein:
the pogo actuators comprise at least one of electromechanical actuators, hydraulic actuators, and pneumatic actuators.

11. The system of claim 1, wherein:
the positioning pogos are provided in an arrangement corresponding to an arrangement of the reader pogos.

12. The system of claim 11, wherein:
the positioning pogos being provided in at least one of the same quantity, relative spacing, and orientation as the reader pogos.

13. The system of claim 1, wherein:
the flexible member comprises a panel; and
the detail comprises a stiffener configured to be mated to the panel.

14. The system of claim 13, wherein:
the panel is a wing panel of an aircraft wing.

15. The system of claim 1, wherein:
the automated handling mechanism is a robotic device configured to perform one or more of the following operations: pick up, place, manipulate, and position the detail in a pre-programmed manner.

16. The system of claim 1, wherein:
The end effector includes a carrier, the carrier being sized complementary to the detail, the carrier configured to grasp the detail.

17. The system of claim 16, wherein:
the carrier includes at least one jaw configured to clamp the detail against the carrier.

18. The system of claim 1, wherein at least one of the detail and the flexible member are formed of at least one of the following:
metallic material;
composite material including fiber-reinforced polymer matrix material; and
any combination of metallic material and composite material.

19. A system for distortional clamping of a flexible member into a contour complementary to a detail, comprising:
a dimensional reader having a plurality of reader pogos being axially movable into contacting relation with a detail and being coupled to displacement transducers configured to measure a detail contour and record reader pogo position data representative of the detail contour;
a positioning fixture physically separated from the dimensional reader and having a plurality of positioning pogos and at least one clamping finger configured to mechanically clamp a flexible member between the plurality of positioning pogos and the at least one clamping finger, the plurality of positioning pogos configured to receive the reader pogo position data from the dimensional reader and being axially movable to deflect the flexible member into a contour complementary to the detail contour while the detail is assembled to the flexible member; and
an automated handling mechanism having an end effector configured to position the detail relative to the dimensional reader.

20. A system for distortional clamping of an aircraft wing panel into a contour complementary to a side-of-body chord, comprising:
a dimensional reader having a plurality of reader pogos being axially movable into contacting relation with a side-of-body chord and being coupled to displacement transducers configured to measure a contour of the side-of-body chord and record reader pogo position data representative of the contour of the side-of-body chord;
a positioning fixture physically separated from the dimensional reader and having a plurality of positioning pogos and at least one clamping finger configured to mechanically clamp an aircraft wing panel between the plurality of positioning pogos and the at least one clamping finger, the plurality of positioning pogos configured to receive the reader pogo position data from the dimensional reader and being axially movable to deflect the aircraft wing panel into a contour complementary to the contour of the side-of-body chord while the side-of-body chord is assembled to the aircraft wing panel; and
an automated handling mechanism having an end effector configured to position the side-of-body chord relative to the dimensional reader.

\* \* \* \* \*